United States Patent

(11) 3,599,417

[72] Inventors George B. Zurheide
Upper St. Clair;
Frank E. Harvey, Pittsburgh, both of, Pa.
[21] Appl. No. 804,909
[22] Filed Mar. 6, 1969
[23] Division of Ser. No. 672,211, Oct. 2, 1967, Pat. No. 3,468,434
[45] Patented Aug. 17, 1971
[73] Assignee PPG Industries, Inc.
Pittsburgh, Pa.

[54] METHOD OF PLACING PACKAGES OF STRAND ON A TWIST FRAME
3 Claims, 9 Drawing Figs.
[52] U.S. Cl............................................. 57/156, 214/152
[51] Int. Cl..................................................... D01h 9/00
[50] Field of Search.... 214/152 16.4; 57/156, 52, 54

[56] References Cited
UNITED STATES PATENTS

| | | | |
|---|---|---|---|
| 3,112,601 | 12/1963 | McCullough............... | 57/52 |
| 3,116,586 | 1/1964 | Ingham....................... | 57/52 |
| 3,123,967 | 3/1964 | Ingham....................... | 57/52 |
| 3,410,069 | 11/1968 | Tai et al..................... | 57/52 |

Primary Examiner—Gerald M. Forlenza
Assistant Examiner—Raymond B. Johnson
Attorney—Chisholm and Spencer ABSTRACT: A crane movable along selected paths and with platforms is used to pull up storage racks on which are stored tubular fiber packages and to convey the racks to twist frames for loading with the packages. The platforms are movable vertically, adjustably and independently to positions for use of handling the packages from the storage rack to the twist frame spindles.

INVENTORS
GEORGE B. ZURHEIDE
FRANK E. HARVEY
BY
Chisholm and Spencer
ATTORNEYS

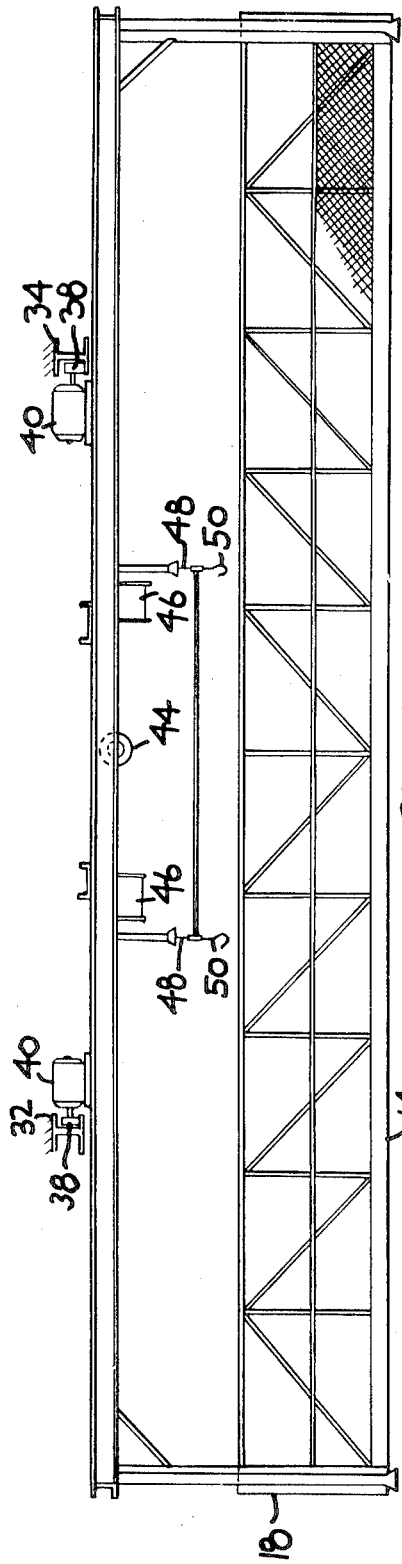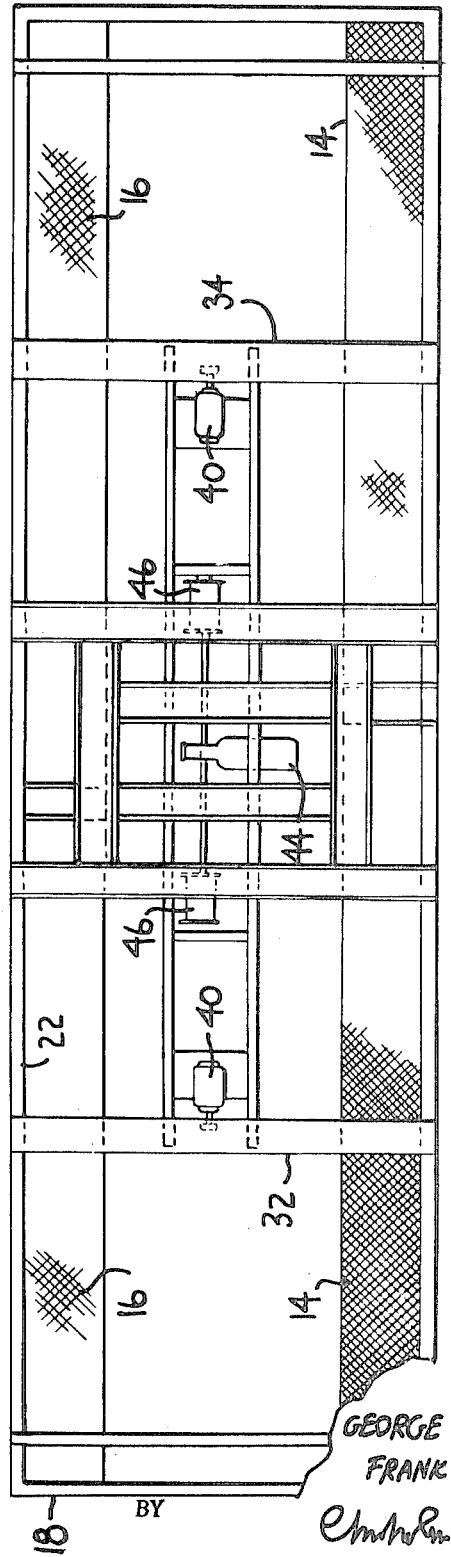

PATENTED AUG 17 1971
3,599,417
SHEET 3 OF 4
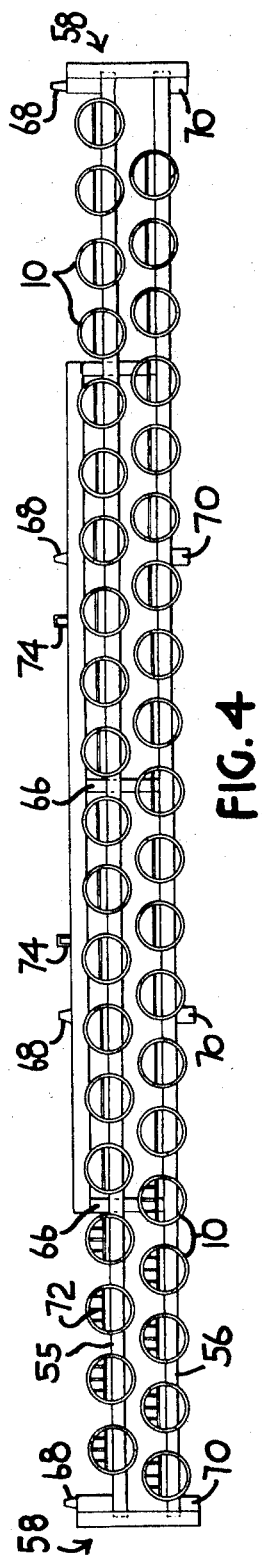
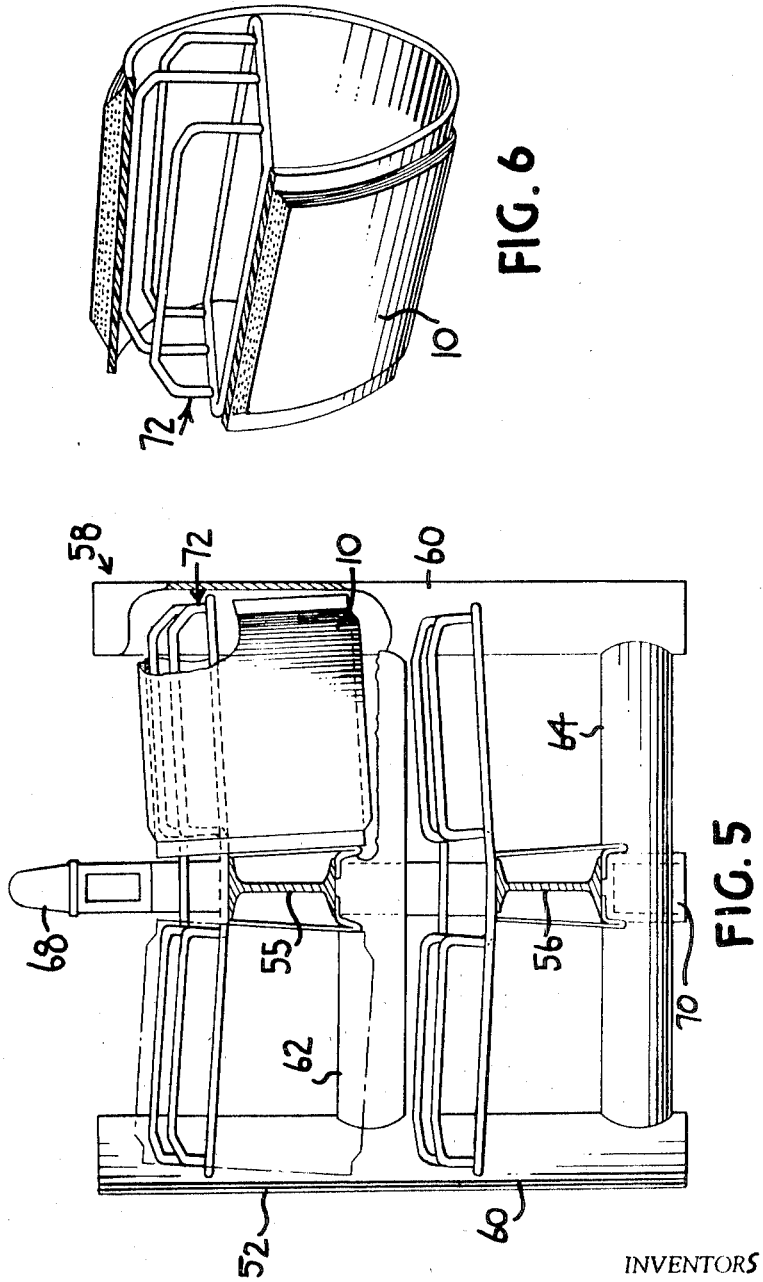
INVENTORS
GEORGE B. ZURHEIDE
FRANK E. HARVEY
BY
ATTORNEYS

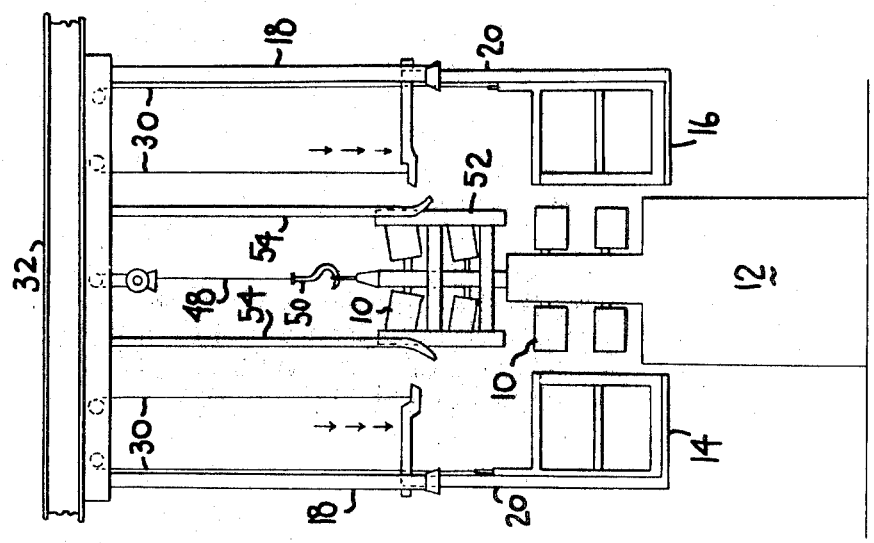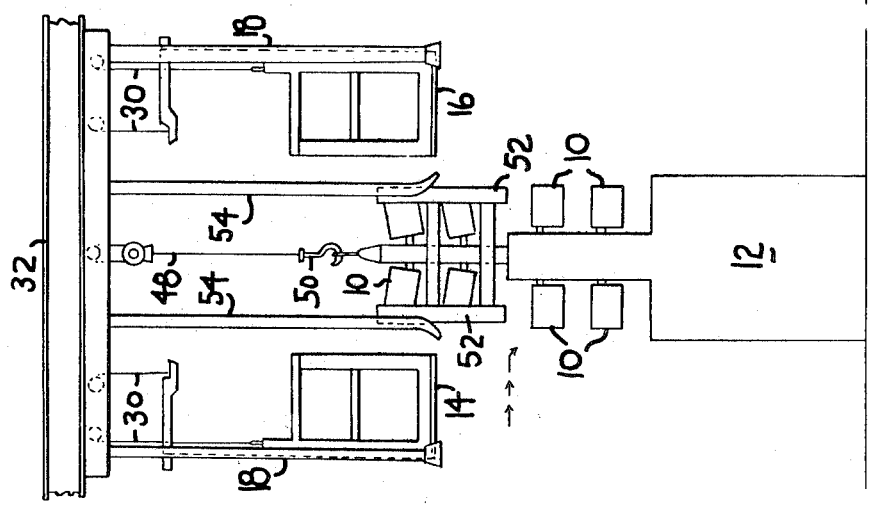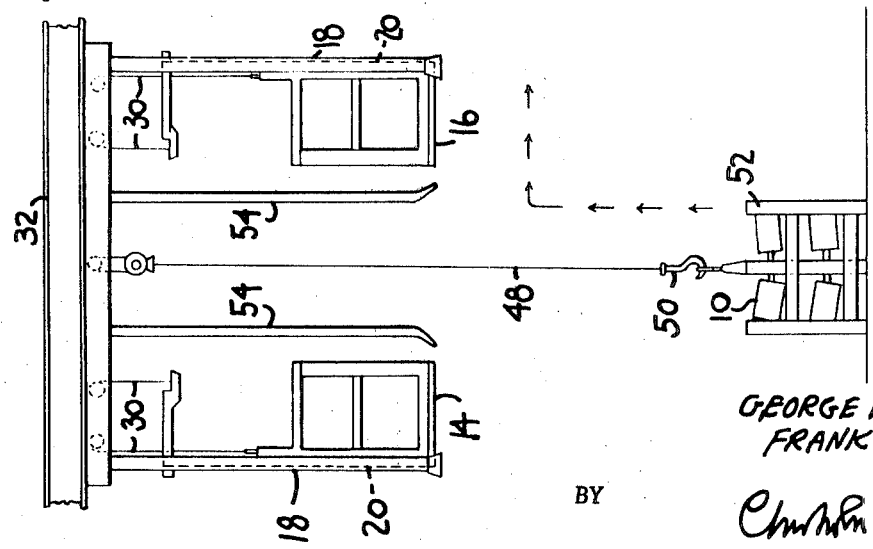

3,599,417

METHOD OF PLACING PACKAGES OF STRAND ON A TWIST FRAME

CROSS-REFERENCE TO RELATED APPLICATIONS

This application is a division of our copending application, Ser. No. 672,211 filed Oct. 2, 1967 now U.S. Pat. No. 3,468,434 issued Sept. 23, 1969

BACKGROUND OF THE INVENTION

This invention relates to material handling and especially to a material handling arrangement for transporting fiber packages to a twist frame for placement on the spindles of the frame. For convenience, the invention will be described specifically with respect to the handling of glass fiber forming packages; it being understood that the invention can be used in the handling of other materials if so desired.

In the production of fiber glass, a plurality of glass fibers are drawn from a mass of molten glass in a bushing having orifices therein through which glass flows. The fibers or filaments, as they are called, are grouped together as a strand and are collected on a rotating tubular package known as a forming package. Strand integrity is maintained by the application of a binder to the fibers just prior to their being grouped into the strands.

After a good end is found on the forming package, i.e., it being determined that the strand is reasonably continuous and can be unwound from the forming package, the forming package is placed on an adapter of a tube drive of a twist frame wherein the strand is twisted to a desired degree and is wound on bobbins for use in the manufacture of textiles and the like.

In the conventional operation, the forming packages are, after having an end found, placed on a package holder on a storage rack or truck. The conventional storage rack is constructed so as to be movable on casters and is generally hand pushed to a twist frame whereupon the packages are manually loaded on the twist frame. Empty packages are, of course, removed from the frame.

This procedure has proven to be satisfactory when the forming packages are of conventional size and weight, as on the order of 6 inches in diameter and about 8 pounds. Using such packages, the twist frame tube drives are so arranged and located that they can easily be reached from the factory floor by an averaged height person, either male or female.

The trend, however, is to larger packages both in diameter and weight which has necessitated a redesign of the twist frame, placing the tube drives higher from the factory floor, so that the loading of the frame becomes a burden.

SUMMARY OF THE INVENTION

In order to effectively load a twist frame with the large, heavy forming packages, it is proposed to store the packages, after a good end has been found, on a storage rack having at least the same number of package holders and in substantially the same arrangement as the arrangement of twist frame tube drives, convey the storage rack, so loaded to a position over the twist frame and to lower the rack to a desired elevation with respect to the twist frame, and in such position remove the packages therefrom and load the twist frame.

The conveyance of the storage rack is accomplished by a crane having spaced platforms for twist frame loaders, the platforms being spaced, so as to be located on opposite sides of the rack and being movable vertically, adjustably and independently to be positioned on opposite sides of the twist frame at a height from the factory floor permitting ease of loading of the twist frame tube drives with the handling of the relatively large, heavy packages.

The crane is self-driven by electric motors on tracks or rails suspended from the ceiling of the factory, the tracks being arranged above a series of twist frames which require periodic loading and extending into the area where the storage racks are housed and loaded.

BRIEF DESCRIPTION OF THE DRAWINGS

FIG. 2 is a side view of the conveyor or crane of this invention;

FIG. 3 is a top view of the structure shown in FIG. 2;

FIG. 4 is a side view of a storage rack;

FIG. 5 is an end view of the storage rack as illustrated in FIG. 4;

FIG. 6 is a perspective view of a package holder of the storage rack of FIGS. 4 and 5; and FIGS. 7, 8 and 9 are end views of the apparatus of this invention in three positions of use.

DESCRIPTION OF THE PREFERRED EMBODIMENT

Figure 1:
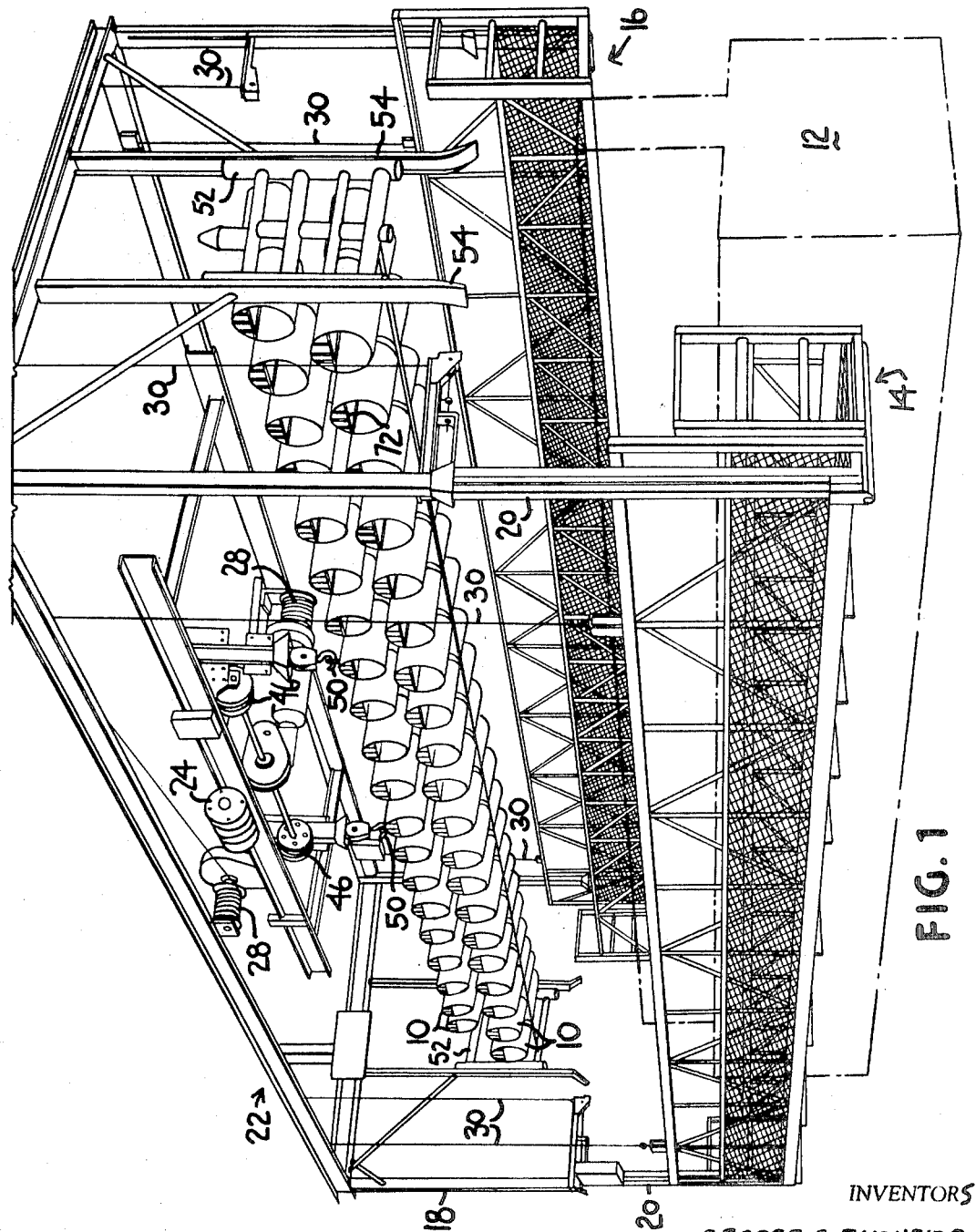
FIG. 1 is an isometric view of the apparatus of this invention in its environment in a fiber processing plant.

Looking now at the drawings, and especially FIGS. 1 to 3, there is shown a materials handling system for conveying forming packages 10 to a twist frame, generally identified as 12. The twist frame is a standard frame modified to accept the particular sized packages being conveyed thereto and, because it does not form a part of this invention, except to be that apparatus to which the packages are conveyed, further description is not given and is deemed unnecessary.

The material handling system includes a pair of spaced platforms 14, 16 constructed of various metal shapes such as angle bars, bars, pipes, grating, etc. which are approximately the same length as a twist frame 12.

Each platform 14 or 16 is vertically movable independently of the other from a position where it will clear a twist frame to a position at one side thereof, at which position the twist frame is loaded, The vertical position of each platform is adjustable. To guide the platforms in their movement substantially vertically, either upwardly or downwardly, there are provided guide channels 18 into which the rear corner members 20 of the platforms are received. The guide channels 18 are part of a framework 22 which interconnects and supports the platforms in their spaced relationship. Reversible motors 24 (only one of which is shown in FIG. 1 for sake of clarity are provided, supported on the framework 22, to raise and lower the platforms 14, 16, respectively, each motor having a reel 28 for receiving cables 30 connected to the platforms 14, 16. By energization of the motors 24, the platforms 14, 16 can be raised and/or lowered independently of each other and adjustably within limits of vertical travel.

The framework 22 constitutes a carriage movable along fixed rails 32, 34 which span the twist room in which a series of twist frames are located.

Trolley assemblies 36 fixed to the frame or carriage 22 engage the rails 32, 34 (see FIG. 2) and provide means for guiding the handling system therealong. Driving wheels 38 driven by a motor 40 propel the carriage 22. Limit switches may be provided, which are coordinated with twist frame positions, so that the carriage will automatically stop at a fixed position relative to a twist frame.

Intermediate the platforms 14, 16 and the ends of the carriage 22 and carried by the carriage is a reversible motor 44 having a pair of reels 46 each carrying cables 48 to which hooks 50 are attached.

The hooks 50 are used to hook onto a storage rack 52 (see FIGS. 4, 7, 8 and 9 carrying a supply of forming tubes 10, lift the rack as in FIG. 7 to its position illustrated in FIG. 8, transport the rack to a twist frame 12 and then lower the rack to a position wherein it can easily be unloaded from the platforms as in FIG. 9. Channel guides 54 are connected to the carriage 22 in order to guide the rack 52 and eliminate sway therein while being transported, etc.

The storage rack 52 is best illustrated in FIGS. 4 and 5 and includes longitudinal beam members 55, 56 connected to end members 58 constructed of upright structural members 60 and cross-structural members 62, 64, the latter being connected respectively to the beam members 55, 56, respectively. Suitable intermediate bracing is used, such as members 66. At each end there is a conical member 68 connected to beam 55 and a tubular member 70 connected to beam 56 and member 64. When the racks are stacked, the conical members are received in members 70 and the ends of uprights 60 abut one another.

Along the length of the beams and on opposite sides thereof, there are spaced package holders 72, each constructed of rods as shown especially in FIG. 6. For convenience, the holders are arranged in substantially the same spacing and order as holders on a twist frame. Hook eyes 74 are welded to the beam 55 to receive the hooks 50 from the carriage 22.

In operation, the carriage is moved into the package storage room and by hooks 50 and related mechanism, a filled storage rack is picked up and moved or lifted into position between platforms in their raised position. The carriage is moved along the tracks to a twist frame location where the rack is lowered and the platforms are lowered. Operators on the platforms remove empty packages on the frame and replace them with filled packages from the rack, after which the platforms are raised, the rack with empty forming tubes is raised and the carriage is then moved to a location where the empty rack is deposited in a rack storage area. Then, the process is repeated, i.e., a filled rack is picked up to be transported to a twist frame for loading, etc. The sequence of positions is illustrated in FIGS. 7, 8 and 9 which are self-explanatory.

We claim:

1. A method of placing packages of strand on a twist frame from a storage rack having package holders arranged on opposite sides thereof in substantially the same arrangement as spindles on the twist frame using a horizontally movable carriage, having vertically movable platforms and storage rack lifting means positioned therebetween comprising the steps of:

a. arranging said packages on said storage rack in substantially the same relationship as the spindles on said twist frame;
 b. engaging said storage rack by said lifting means and lifting said rack to its raised position between said platforms in their raised positions;
 c. conveying said carriage with the so-arranged storage rack to a position above said twist frame;
 d. lowering said storage rack to a position immediately above said twist frame so that corresponding package holders and spindles are in close relation;
 e. lowering at least one said platform to a position adjacent said twist frame spindles and said storage rack package holders so that corresponding spindles and package holders having packages for transfer are accessible from said platform;
 f. removing packages from said spindles and replacing said removed packages with packages from corresponding package holders, placing said removed packages on package holders of said storage rack; and
 g. lifting said platform and said storage rack to raised positions and conveying said carriage away from said twist frame.

2. The method of placing packages of strand on a twist frame according to claim 1 wherein;
 the package holders on said storage rack are substantially horizontal during use; and
 packages are maintained in substantially horizontal position during lifting, conveying and lowering.

3. The method of placing packages of strand on a twist frame according to claim 2 wherein the steps of removing packages from spindles, replacing said removed packages and placing said removed packages on package holders are performed manually.